(12) United States Patent
Fang et al.

(10) Patent No.: US 10,641,936 B2
(45) Date of Patent: May 5, 2020

(54) COMPOSITE FILM AND DISPLAY DEVICE

(71) Applicant: Coretronic Corporation, Hsin-Chu (TW)

(72) Inventors: Chong-Yang Fang, Hsin-Chu (TW); Wen-Chun Wang, Hsin-Chu (TW); Chi-Wen Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 394 days.

(21) Appl. No.: 15/591,123

(22) Filed: May 10, 2017

(65) Prior Publication Data

US 2017/0343715 A1 Nov. 30, 2017

(30) Foreign Application Priority Data

May 24, 2016 (TW) .............................. 105116042 A

(51) Int. Cl.
*G02B 5/30* (2006.01)
*G02F 1/1335* (2006.01)
(Continued)

(52) U.S. Cl.
CPC ........... *G02B 5/3041* (2013.01); *G02B 27/28* (2013.01); *G02F 1/13362* (2013.01);
(Continued)

(58) Field of Classification Search
CPC ........ G02B 1/04; G02B 5/3033; G02B 1/105; G02B 1/14; G02B 5/3083; G02B 5/30;
(Continued)

(56) References Cited

U.S. PATENT DOCUMENTS 4,688,900 A 8/1987 Doane et al.
5,301,046 A 4/1994 Konuma et al.
(Continued)

FOREIGN PATENT DOCUMENTS

CN 1702517 11/2005
CN 1708704 12/2005
(Continued)

OTHER PUBLICATIONS

"Office Action of Taiwan Counterpart Application," dated Jun. 26, 2017, p. 1-p. 3, in which the listed references were cited.
(Continued)

*Primary Examiner* — Collin X Beatty
*Assistant Examiner* — Grant A Gagnon
(74) *Attorney, Agent, or Firm* — JCIPRNET

(57) ABSTRACT

A composite film including a first polarizing film, at least one second polarizing film, and at least one first phase compensation film is provided. The first polarizing film has a first transmission axis. Each second polarizing film has a second transmission axis parallel to the first transmission axis. The at least one first phase compensation film is disposed between the first polarizing film and the at least one second polarizing film. Each first phase compensation film has a first optical axis. An orthographic projection of the first optical axis on the first polarizing film is parallel to an axial direction of the first transmission axis, and a first included angle between the first optical axis and the first polarizing film is greater than 0 degrees and less than 90 degrees. A display device is also provided.

16 Claims, 11 Drawing Sheets

(51) Int. Cl.
*G02B 27/28* (2006.01)
*G02F 1/13363* (2006.01)
*G02F 1/13357* (2006.01)

(52) U.S. Cl.
CPC ........ *G02F 1/13363* (2013.01); *G02B 5/3033* (2013.01); *G02B 5/3083* (2013.01); *G02F 2001/133633* (2013.01); *G02F 2413/08* (2013.01)

(58) Field of Classification Search
CPC .... G02B 5/3025; G02B 1/111; G02B 5/3041; G02B 27/283; G02B 27/286; G02B 5/3016; G02B 5/305; G02B 1/02; G02B 1/043; G02B 5/02; G02B 5/0278; G02B 5/3058; G02B 1/10; G02B 2027/0112; G02B 21/14; G02B 27/0006; G02B 27/0101; G02B 27/0172; G02B 5/0221; G02B 5/0242; G02B 5/208; G02B 5/32; G02B 19/0028; G02B 19/0057; G02B 1/007; G02B 1/08; G02B 1/11; G02B 1/118; G02B 1/12; G02B 1/16; G02B 1/18; G02B 2027/011; G02B 2027/012; G02B 2027/0125; G02B 2027/0138; G02B 2027/0174; G02B 2027/0178; G02B 21/0032; G02B 2207/101; G02B 23/08; G02B 23/105; G02B 26/123; G02B 27/0081; G02B 27/01; G02B 27/0103; G02B 27/0905; G02B 27/0927; G02B 27/0944; G02B 27/0988; G02B 27/1046; G02B 27/14; G02B 27/142; G02B 27/145; G02B 27/2214; G02B 27/26; G02B 27/28; G02B 27/281; G02B 27/285; G02B 27/48; G02B 27/52; G02B 27/58; G02B 3/00; G02B 3/005; G02B 5/008; G02B 5/0215; G02B 5/0284; G02B 5/04; G02B 5/045; G02B 5/223; G02B 5/3008; G02B 5/3075; G02B 6/00; G02B 6/0053; G02B 6/0065; G02B 6/1226; G02B 6/2726; G02B 6/2793; G02B 6/29397; G02B 6/32; G02B 6/4203; G02B 6/4206; G02B 6/4208; G02B 6/4275; G02B 6/4296; G02F 1/133528; G02F 2201/50; G02F 2202/28; G02F 1/133634; G02F 2001/133607; G02F 2202/40; G02F 1/133308; G02F 1/13363; G02F 2001/133311; G02F 2001/133531; G02F 2001/133635; G02F 2413/11; G02F 2413/12; G02F 1/0136; G02F 1/0147; G02F 1/1303; G02F 1/133305; G02F 1/133502; G02F 1/133504; G02F 1/133526; G02F 1/133533; G02F 1/133536; G02F 1/133608; G02F 1/13362; G02F 1/134363; G02F 1/13439; G02F 1/1393; G02F 1/1396; G02F 2001/133302; G02F 2001/13332; G02F 2001/133325; G02F 2001/133331; G02F 2001/133357; G02F 2001/133507; G02F 2001/133541; G02F 2001/133548; G02F 2001/133637; G02F 2202/023; G02F 2202/025; G02F 2202/22; G02F 2413/03; G02F 2413/04; G02F 2413/08; G02F 2413/105
USPC ...................................................... 359/485
See application file for complete search history.

(56) References Cited

U.S. PATENT DOCUMENTS

| | | |
|---|---|---|
| 7,880,843 B2 | 2/2011 | Morishita et al. |
| 2002/0130989 A1 | 9/2002 | Nakao et al. |
| 2005/0206814 A1 | 9/2005 | Histake |
| 2006/0103782 A1 | 5/2006 | Adachi et al. |
| 2007/0188686 A1 | 8/2007 | Yano et al. |
| 2007/0236939 A1 | 10/2007 | Ouderkirk et al. |
| 2009/0015540 A1 | 1/2009 | Suzuki |
| 2009/0174843 A1 | 7/2009 | Sakai et al. |
| 2010/0026946 A1 | 2/2010 | Iwamoto |
| 2010/0149459 A1 | 6/2010 | Yabuta et al. |
| 2010/0265435 A1 | 10/2010 | Hwang et al. |
| 2010/0289989 A1 | 11/2010 | Adachi et al. |
| 2011/0043736 A1 | 2/2011 | Liu |
| 2011/0309398 A1 | 12/2011 | Ito et al. |
| 2012/0194752 A1* | 8/2012 | Lin .................. G02B 27/26 349/15 |
| 2015/0208537 A1 | 7/2015 | Cho et al. |
| 2015/0277012 A1 | 10/2015 | Nakamura et al. |
| 2015/0346532 A1 | 12/2015 | Do et al. |
| 2016/0356943 A1 | 12/2016 | Choi et al. |
| 2017/0116937 A1 | 4/2017 | Du et al. |
| 2017/0213874 A1 | 7/2017 | Liu et al. |
| 2017/0219859 A1 | 8/2017 | Christophy et al. |
| 2018/0321553 A1 | 11/2018 | Robinson et al. |
| 2018/0335656 A1 | 11/2018 | Chen et al. |

FOREIGN PATENT DOCUMENTS

| | | |
|---|---|---|
| CN | 101473168 | 7/2009 |
| CN | 101661190 | 3/2010 |
| CN | 101681061 | 3/2010 |
| CN | 101414022 | 10/2010 |
| CN | 202141874 | 2/2012 |
| EP | 0918247 | 5/1999 |
| EP | 1536269 | 6/2005 |
| EP | 2051134 | 4/2009 |
| JP | 2002055341 | 2/2002 |
| JP | 2004206130 | 7/2004 |
| JP | 2008003450 | 1/2008 |
| JP | 2008096458 | 4/2008 |
| JP | 2009522601 | 6/2009 |
| JP | 4369222 | 11/2009 |
| JP | 2011002596 | 1/2011 |
| JP | 2011508270 | 3/2011 |
| TW | 200630651 | 9/2006 |
| TW | I274918 | 3/2007 |
| TW | 200714943 | 4/2007 |
| TW | 200730935 | 8/2007 |
| TW | 200807083 | 2/2008 |
| TW | 200903053 | 1/2009 |
| TW | I309312 | 5/2009 |
| TW | 201031969 | 9/2010 |
| TW | I356937 | 1/2012 |
| TW | M537663 | 3/2017 |
| WO | 2012090769 | 7/2012 |
| WO | 2016195786 | 12/2016 |
| WO | 2017061768 | 4/2017 |
| WO | 2018221413 | 12/2018 |

OTHER PUBLICATIONS

"Search Report of Europe Counterpart Application", dated Oct. 20, 2017, p. 1-p. 9, in which the listed references were cited.
Yuzo Histake, et al., "31.3: Viewing Angle Controllable LCD using Variable Optical Compensator and Variable Diffuser," SID International symposium digest of technical papers, vol. 36, Issue 1, May 2005, pp. 1218-1221.
"Office Action of China Counterpart Application," dated Apr. 30, 2019, p. 1-p. 6.
"Search Report of Europe Counterpart Application", dated Mar. 22, 2019, p. 1-p. 7.

(56) References Cited

OTHER PUBLICATIONS

Jinbi Leng et al.,"Viewing angle changeable display", Proceedings of SPIE, vol. 7658, Oct. 22, 2010, pp. 1-7.

* cited by examiner

θ1= 0 degrees

θ1= 10 degrees

θ1= 20 degrees

θ1= 30 degrees $\theta 1 = 40$ degrees $\theta 1 = 50$ degrees

θ1= 60 degrees

θ1= 70 degrees

θ1= 80 degrees

θ1= 90 degrees

COMPOSITE FILM AND DISPLAY DEVICE

CROSS-REFERENCE TO RELATED APPLICATION

This application claims the priority benefit of Taiwan application serial no. 105116042, filed on May 24, 2016. The entirety of the above-mentioned patent application is hereby incorporated by reference herein and made a part of this specification.

BACKGROUND OF THE INVENTION

Field of the Invention

The invention relates to a composite film and a display device, and particularly relates to a composite film capable of limiting the viewing angle and reducing large-angle light leakage and a display device using the same.

Description of Related Art

In general, in order to allow multiple viewers to watch together, a display device usually has a display effect of wide viewing angle. However, in some situations or occasions, for example, when browsing personal website or confidential information or entering passwords in public, confidential information is easily peeped by other people due to the display effect of wide viewing angle, which may cause leakage of confidential information. In order to achieve the requirements of anti-spy or viewing angle limitations, a light control film (LCF) is usually placed on a display panel or a backlight module of the conventional display device, so as to filter large-angle light. However, the light control film is quite expensive. Additionally, a periodic structure of the light control film is not only easy to generate Moiré pattern with the display device, but also to make overall brightness of the display device decrease by about 30%.

The information disclosed in this "BACKGROUND OF THE INVENTION" section is only for enhancement of understanding of the background of the described technology and therefore it may contain information that does not form the prior art that is already known to a person of ordinary skill in the art. Further, the information disclosed in the "BACKGROUND OF THE INVENTION" section does not mean that one or more problems to be resolved by one or more embodiments of the invention was acknowledged by a person of ordinary skill in the art.

SUMMARY OF THE INVENTION

The invention provides a composite film, which can limit viewing angle and reduce large-angle light leakage.

The invention also provides a display device using the above composite film, so as to achieve the requirements of anti-spy or viewing angle limitations.

Other objectives and advantages of the invention may be further illustrated by the technical features broadly embodied and described as follows.

In order to achieve at least one of the objects or other objects, an embodiment of the invention provides a composite film including a first polarizing film, at least one second polarizing film, and at least one first phase compensation film. The first polarizing film has a first transmission axis. The at least one second polarizing film is disposed at one side of the first polarizing film. Each second polarizing film has a second transmission axis parallel to the first transmission axis. The at least one first phase compensation film is disposed between the first polarizing film and the at least one second polarizing film, wherein each first phase compensation film has a first optical axis. An orthographic projection of the first optical axis on the first polarizing film is parallel to an axial direction of the first transmission axis, and a first included angle between the first optical axis and the first polarizing film is greater than 0 degrees and less than 90 degrees.

In order to achieve at least one of the objects or other objects, an embodiment of the invention provides a display device including a backlight module, a display panel, and the abovementioned composite film. The display panel is disposed at one side of the backlight module. The composite film is disposed at one side of the backlight module and overlapped with the display panel.

Based on the above, the embodiments of the invention have at least one of the advantages or effects below. In the composite film of the invention, the first optical axis of each first phase compensation film is inclined relative to the first polarizing film, and the orthographic projection of the first optical axis on the first polarizing film is parallel to the axial direction of the first transmission axis. A polarization direction of a light beam incident the composite film in a large angle along the direction perpendicular to the axial direction of the first transmission axis can be deflected by each first phase compensation film, such that the large-angle light beam is absorbed by the second polarizing film. Thus, the composite film can limit viewing angle and reduce large-angle light leakage. Also, the display device using the composite film can achieve the requirements of anti-spy and viewing angle limitations.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
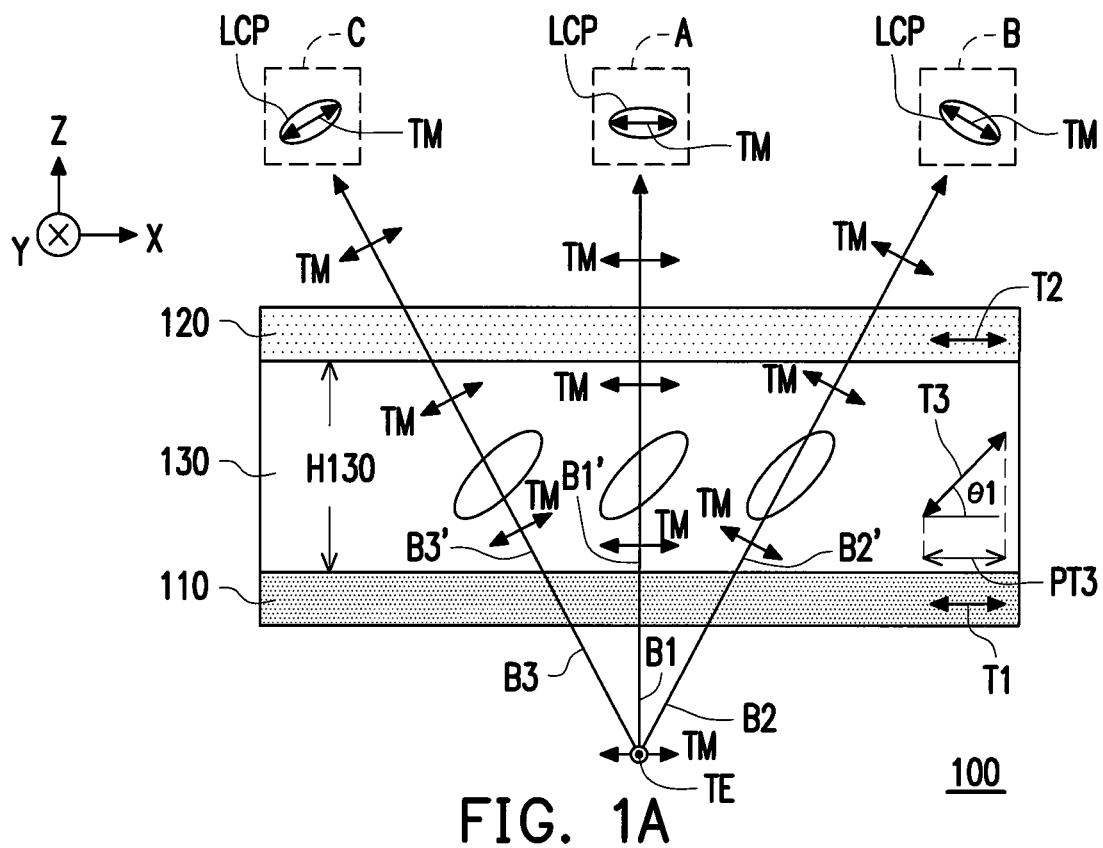
FIG. 1A and FIG. 1B are schematic cross-sectional diagrams of a composite film on an X-Z plane and on a Y-Z plane according to a first embodiment of the invention respectively.
Figure 1B:
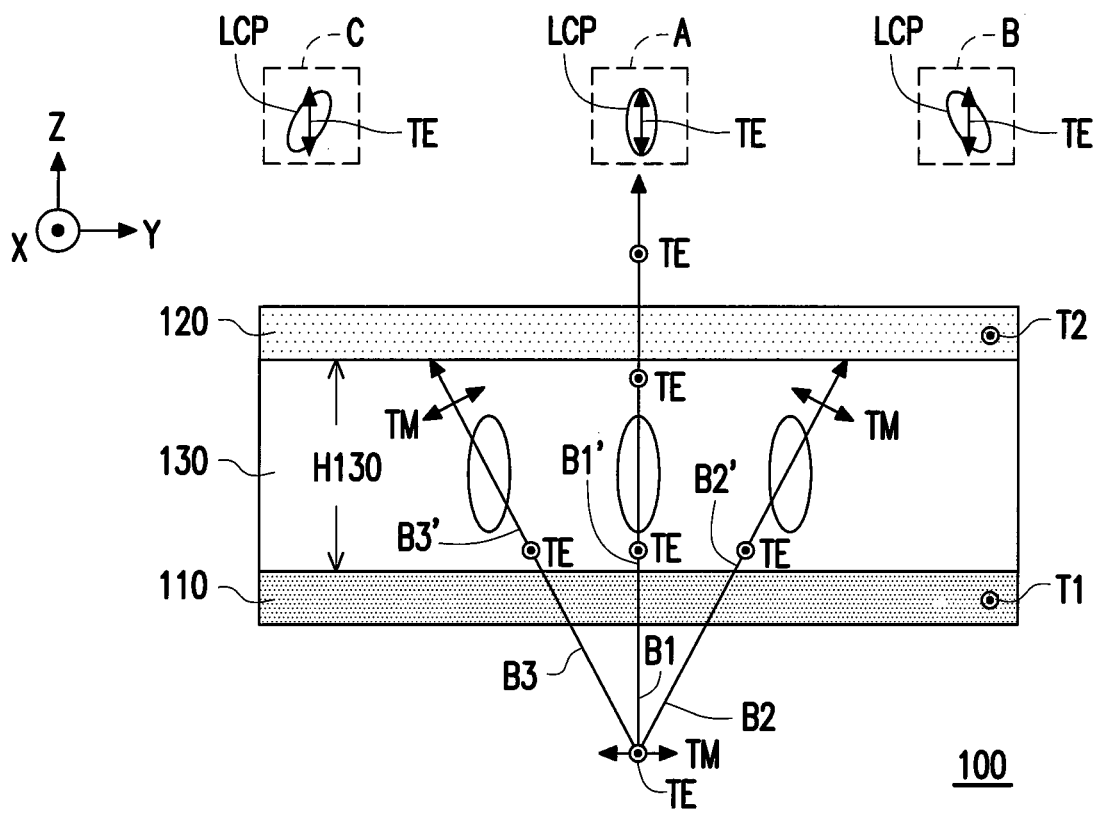
Figure 2A:
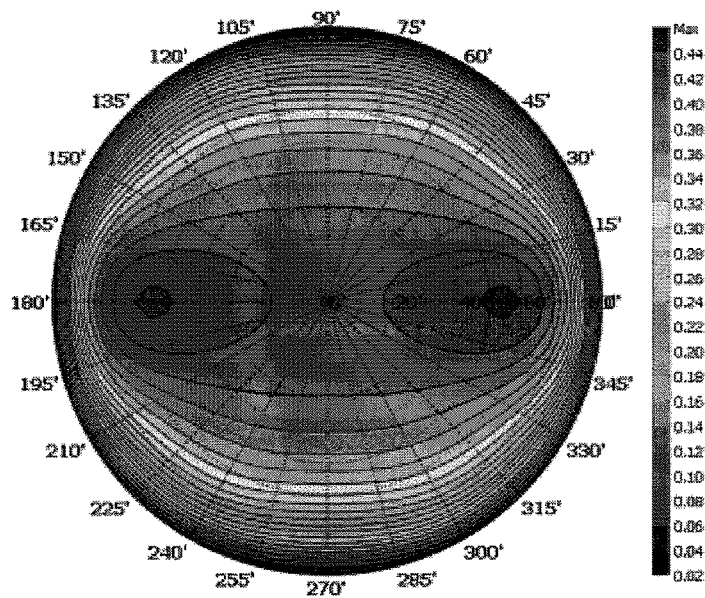
FIG. 2A to FIG. 2J are viewing angle distribution diagrams of the composite film of FIG. 1A at a first included angle of 0 degrees to 90 degrees respectively.
Figure 2B:
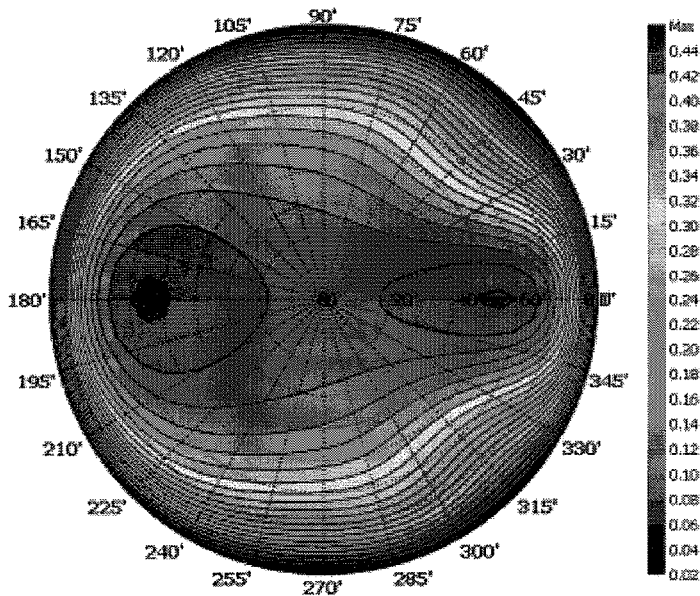
Figure 2C:
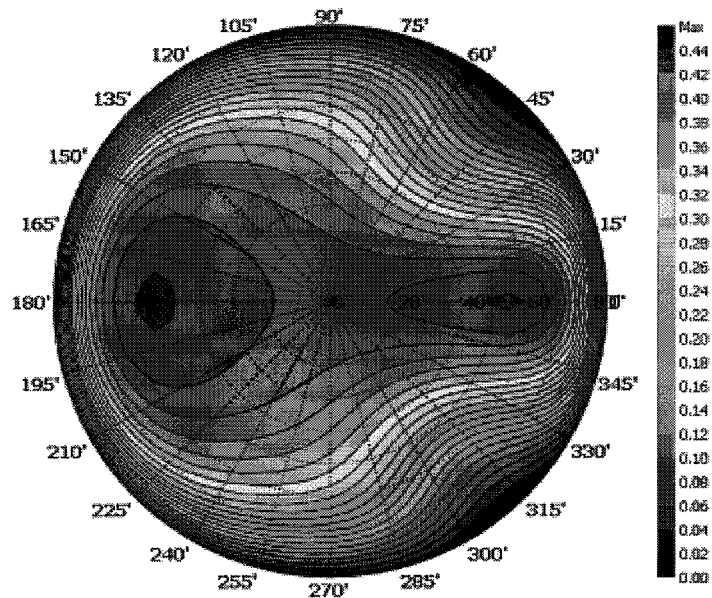
Figure 2D:
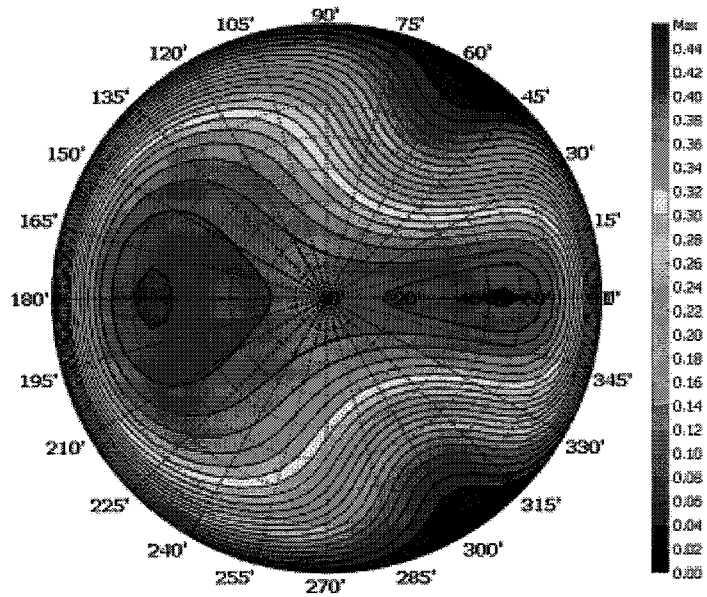
Figure 2E:
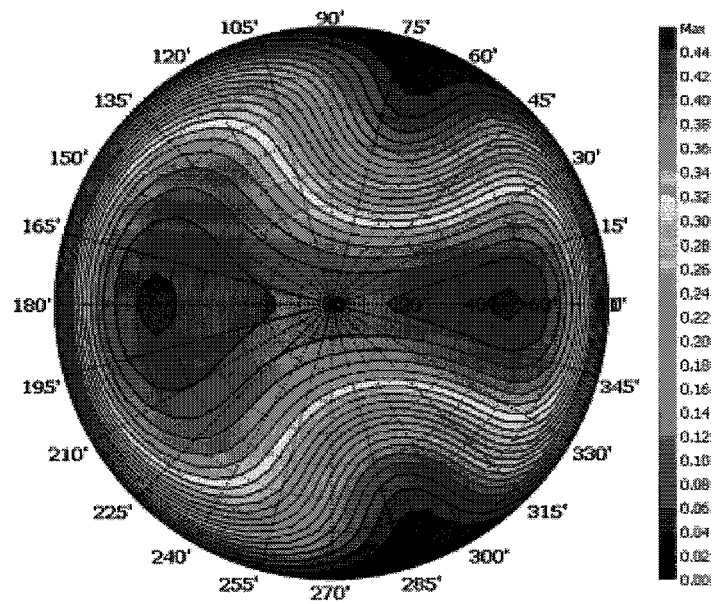
Figure 2F:
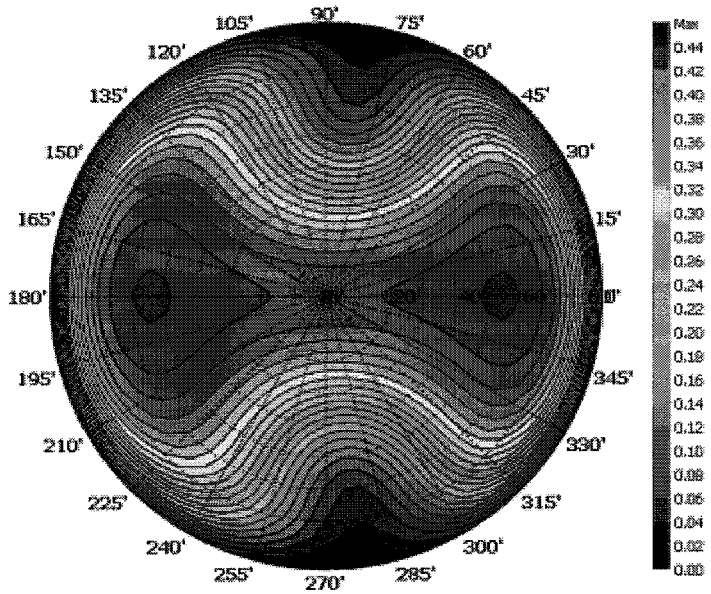
Figure 2G:
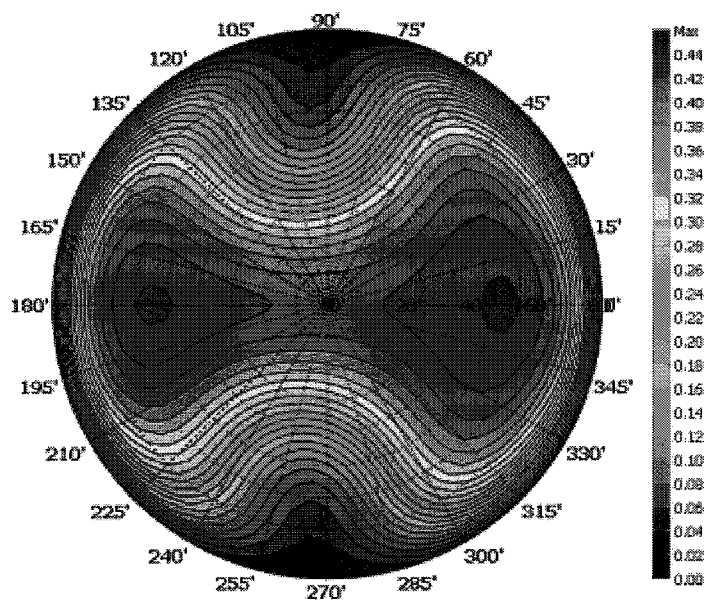
Figure 2H:
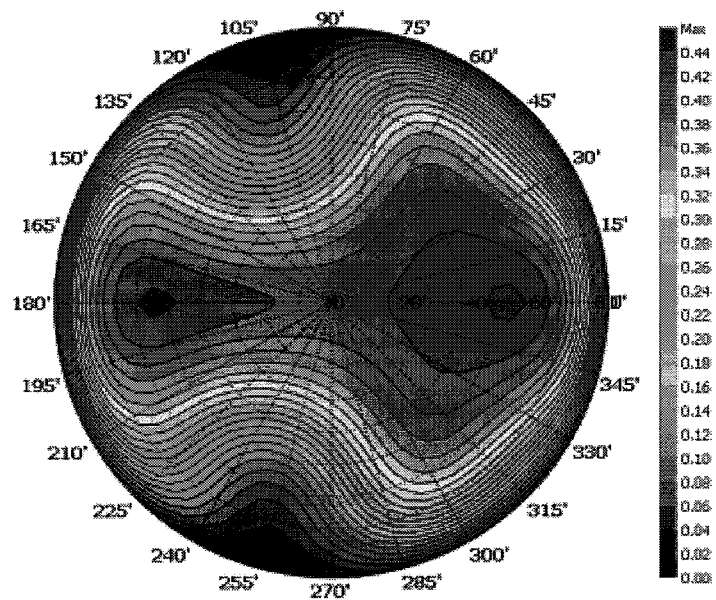
Figure 2I:
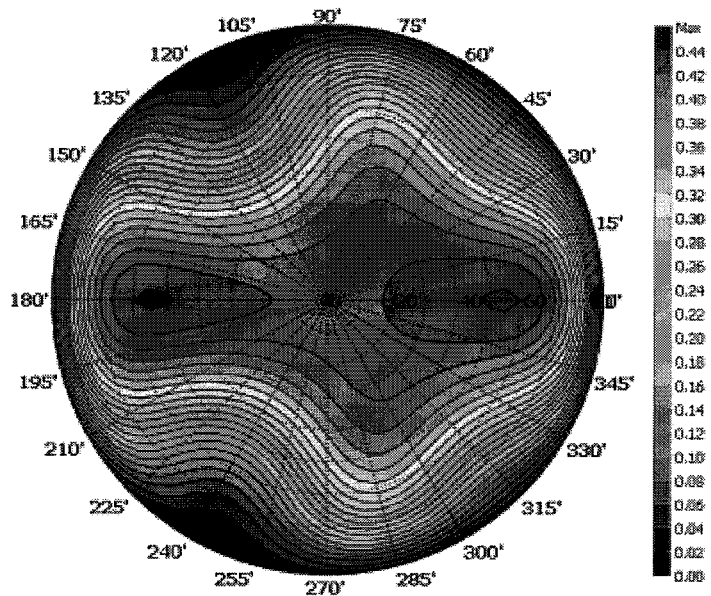
Figure 2J:
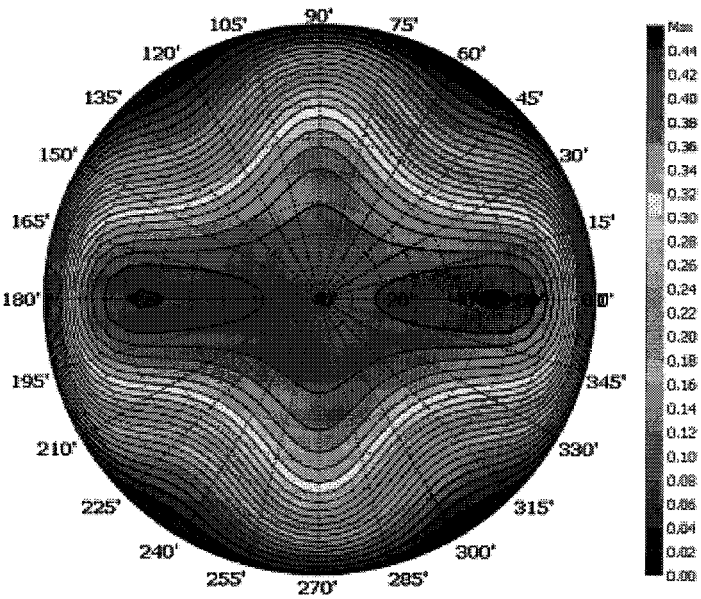

FIG. 1A and FIG. 1B are schematic cross-sectional diagrams of a composite film on an X-Z plane and on a Y-Z plane according to a first embodiment of the invention respectively, wherein the X-Z plane refers to a reference plane constituted by an X direction and a Z direction, and the Y-Z plane refers to a reference plane constituted by a Y direction and the Z direction. The X, Y and Z directions are perpendicular to each other.

Referring to FIG. 1A and FIG. 1B, a composite film 100 includes a first polarizing film 110, at least one second polarizing film 120, and at least one first phase compensation film 130. The at least one second polarizing film 120 is disposed at one side of the first polarizing film 110, and the at least one first phase compensation film 130 is disposed between the first polarizing film 110 and the at least one second polarizing film 120.

The first polarizing film 110 has a first transmission axis T1, which is suitable to convert a light beam incident the composite film 100 into a linearly polarized light oscillating along a specific direction. For instance, the first polarizing film 110 may be a linear polarizing film. Alternatively, the first polarizing film 110 may be composed of a cholesterol liquid crystal layer and a quarter wave plate.

Each second polarizing film 120 has a second transmission axis T2 parallel to the first transmission axis T1. If the light beam polarized by the first polarizing film 110 is not deflected (i.e., the polarization direction is still parallel to the first transmission axis T1 and the second transmission axis T2) by the at least one first phase compensation film 130 after passing through the at least one first phase compensation film 130, the light beam will pass through the at least one second polarizing film 120. On the other hand, if the polarization direction of the light beam polarized by the first polarizing film 110 is deflected to the direction perpendicular to the second transmission axis T2 by the at least one first phase compensation film 130 after passing through the at least one first phase compensation film 130, the light beam will be filtered by the at least one second polarizing film 120. For instance, each second polarizing film 120 may be an absorption-type polarizing film. The filtration refers to that the polarized light beam is absorbed by the second polarizing film 120. Each second polarizing film 120 may be a linear polarizing film. Alternatively, each second polarizing film 120 may be composed of a cholesterol liquid crystal layer and a quarter wave plate.

Each first phase compensation film 130 has a first optical axis T3. An orthographic projection PT3 of the first optical axis T3 on the first polarizing film 110 is parallel to an axial direction of the first transmission axis T1, and a first included angle $\theta 1$ between the first optical axis T3 and the first polarizing film 110 is greater than 0 degrees and less than 90 degrees. In other words, the first optical axis T3 is not perpendicular or parallel to the first polarizing film 110. For instance, each first phase compensation film 130 is an O-plate, for example. In the embodiment, each first phase compensation film 130 is composed of a liquid crystal polymer LCP, for example. However, the invention is not limited thereto. In other embodiments, each first phase compensation film 130 may also be formed from a polymer material by pulling and extension. Alternatively, each first phase compensation film 130 may be a liquid crystal panel, and an axial direction of the first optical axis T3 is controlled by electrical control means.

In the embodiment, numbers of the at least one second polarizing film 120 and the at least one first phase compensation film 130 are one respectively. However, the invention is not limited thereto. In other embodiments, the numbers of the at least one second polarizing film 120 and the at least one first phase compensation film 130 may be more than one respectively.

A non-polarized light beam B1 forward incident the composite film 100 and non-polarized light beams B2 and B3 incident the composite film 100 in a large angle enter the composite film 100 via the first polarizing film 110, and the non-polarized light beams B1, B2 and B3 are polarized by the first polarizing film 110 respectively so as to form linearly polarized light beams B1', B2' and B3'. Specifically, the non-polarized light beams B1, B2 and B3 include a transverse electric wave TE and a transverse magnetic wave TM respectively, wherein an oscillation direction of the transverse electric wave TE is perpendicular to an incident plane (i.e., paper surface), and an oscillation direction of the transverse magnetic wave TM is parallel to the incident plane.

In FIG. 1A, the incident plane is the X-Z plane. The transverse electric wave TE is oscillated along the direction parallel to the Y direction, and the transverse magnetic wave TM is oscillated on the X-Z plane. The axial direction of the first transmission axis T1 of the first polarizing film 110 is parallel to the X direction and perpendicular to the Y and Z directions. Therefore, the transverse magnetic wave TM oscillated on the X-Z plane will pass through the first polarizing film 110, and the transverse electric wave TE oscillated along the direction parallel to the Y direction will be filtered by the first polarizing film 110. The first polarizing film 110 may be a reflection-type polarizing film. The filtration refers to that the transverse electric wave TE is reflected by the first polarizing film 110 so as to be deflected. On the other hand, the first polarizing film 110 may also be an absorption-type polarizing film. The filtration refers to that the transverse electric wave TE is absorbed by the first polarizing film 110.

In FIG. 1B, the incident plane is the Y-Z plane. The transverse electric wave TE is oscillated along the direction parallel to the X direction, and the transverse magnetic wave TM is oscillated on the Y-Z plane. The axial direction of the first transmission axis T1 of the first polarizing film 110 is parallel to the X direction and perpendicular to the Y and Z directions. Therefore, the transverse magnetic wave TM oscillated on the Y-Z plane will be filtered by the first polarizing film 110, and the transverse electric wave TE oscillated along the direction parallel to the X direction will pass through the first polarizing film 110.

Referring to FIG. 1A, along the direction parallel to the first transmission axis T1 (e.g., X direction), in the process that the linearly polarized light B1' forward incident the composite film 100 and the linearly polarized light beams B2' and B3' incident the composite film 100 in a large angle pass through the first phase compensation film 130, the polarization directions of the linearly polarized light beams B1', B2' and B3' on polarization planes A, B and C (i.e., the oscillation direction of the transverse magnetic wave TM) are all parallel to the projection of the first optical axis T3 of the first phase compensation film 130 on the polarization planes A, B and C (referring to the projection of the liquid crystal polymer LCP on the polarization planes A, B and C). Therefore, the polarization direction of the linearly polarized light beams B1', B2' and B3' passing through the first phase compensation film 130 is consistent with the polarization direction of the linearly polarized light beams B1', B2' and B3' passing through the first polarizing film 110, and the linearly polarized light beams B1', B2' and B3' passing through the first phase compensation film 130 may continue passing through the second polarizing film 120.

On the other hand, referring to FIG. 1B, along the direction perpendicular to the first transmission axis T1 (e.g., Y direction), only in the process that the linearly polarized light B1' passes through the first phase compensation film 130, the polarization direction of the linearly polarized light B1' forward incident the composite film 100 (i.e., the oscillation direction of the transverse electric wave TE) is parallel to the projection of the first optical axis T3 of the first phase compensation film 130 on the polarization plane A (referring to the projection of the liquid crystal polymer LCP on the polarization plane A). As for the linearly polarized light beams B2' and B3' incident the composite film 100 in a large angle in the process of passing through the first phase compensation film 130, the polarization directions of the linearly polarized light beams B2' and B3' (i.e., the oscillation direction of the transverse electric wave TE) are not parallel (including an angle) to the projection of the first optical axis T3 (referring to the projection of the liquid crystal polymer LCP on the polarization planes B and C) of the first phase compensation film 130 on the polarization planes B and C. Therefore, after passing through the first phase compensation film 130, only the linearly polarized light B1' passes through the second polarizing film 120. The polarization directions of the linearly polarized light beams B2' and B3' are deflected by the first phase compensation film 130. For example, the transverse electric wave TE oscillated along the direction parallel to the X direction originally is converted to the transverse magnetic wave TM oscillated on the Y-Z plane. Since the oscillation direction of the transverse magnetic wave TM is perpendicular to the second transmission axis T2, the linearly polarized light beams B2' and B3' are filtered by the second polarizing film 120 (e.g., absorption).

By deflecting the linearly polarized light beams B2' and B3' incident the composite film 100 in a large angle along the direction (e.g., Y direction) perpendicular to the axial direction of the first transmission axis T1 by the first phase compensation film 130, the large-angle linearly polarized light beams B2' and B3' along the Y direction are absorbed by the second polarizing film 120. Thus, the composite film 100 can limit viewing angle along the Y direction and reduce large-angle light leakage along the Y direction. Thereby, the display device using the composite film 100 may achieve the requirements of anti-spy along the Y direction or the limitation of viewing angle along the Y direction and the reduction of large-angle light leakage along the Y direction. Similarly, in another embodiment, if the axial directions of the first transmission axis T1 and the second transmission axis T2 are changed to the direction parallel to the Y direction, and the first optical axis T3 is inclined along the Y direction, the composite film 100 can limit viewing angle along the X direction and reduce large-angle light leakage along the X direction.

FIG. 2A to FIG. 2J are viewing angle distribution diagrams of the composite film of FIG. 1A at a first included angle of 0 degrees to 90 degrees respectively. It can be seen from FIG. 2A to FIG. 2J that, when the first included angle θ1 is between 40 degrees and 80 degrees, on the azimuth of 90 degrees and 270 degrees (i.e., along the Y direction in FIG. 1A and FIG. 1B), the light intensity is rapidly decreased from the zenith angle of 0 degrees to 90 degrees and is nearly symmetrical on the azimuth of 90 degrees and 270 degrees. That is, when the first included angle θ1 is between 40 degrees and 80 degrees, the composite film 100 not only can limit viewing angle along the Y direction and reduce large-angle light leakage along the Y direction, but also can have the advantage of brightness uniformity. When the first included angle θ1 is between 50 degrees and 70 degrees, the effects of narrow viewing angle, reduction of light leakage and brightness uniformity may be further improved.

It is to be added that, under the structure of FIG. 1A and FIG. 1B, the ratio of the linearly polarized light beams B2' and B3' incident the composite film 100 in a large angle along the Y direction filtered by the second polarizing film 120 is related to the amount of phase retardation provided by the first phase compensation film 130. The amount of phase retardation is the product of an absolute value of a difference between refractive indexes (e.g., a refractive index ne of a non-ordinary light minus a refractive index no of an ordinary light) of each first phase compensation film 130 and a thickness H130 of the first phase compensation film 130. In the embodiment, the amount of phase retardation of each first phase compensation film 130 is between 0.1 μm and 8 μm, for example, and the thickness H130 of each first phase compensation film 130 is between 1 μm and 40 μm, for example.

Figure 3:
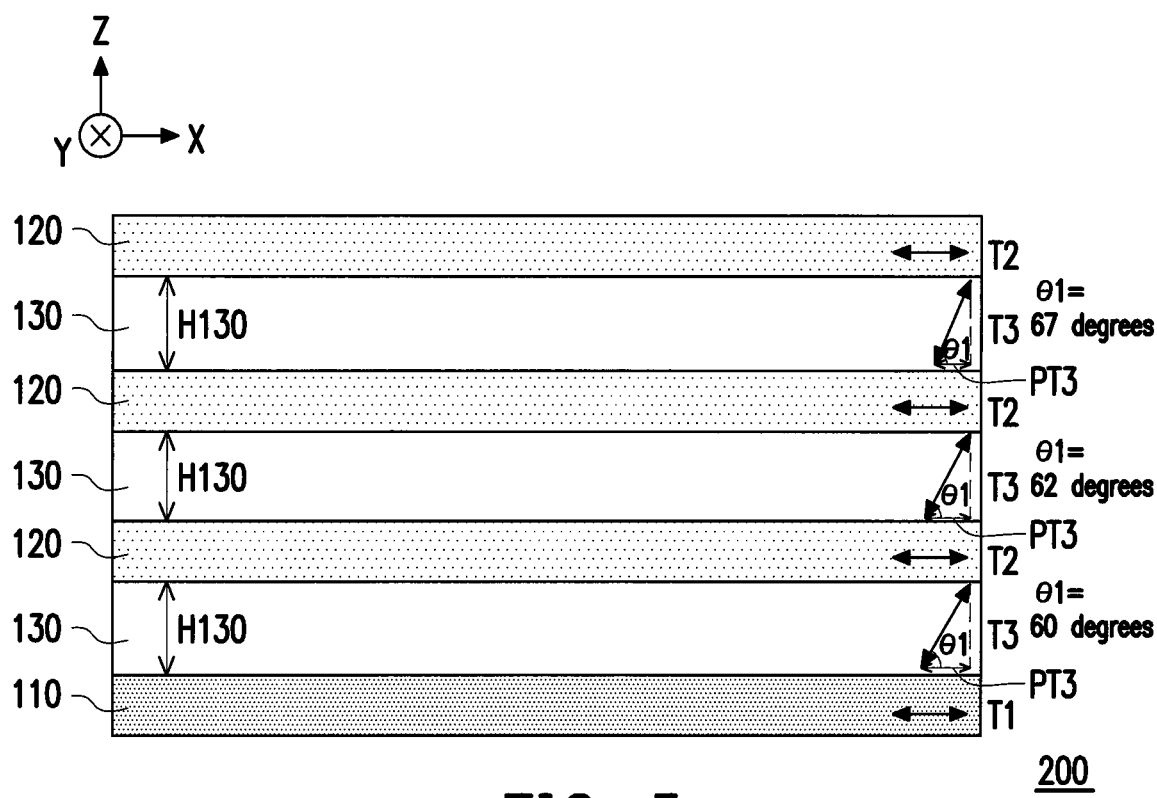
FIG. 3 is a schematic cross-sectional diagram of a composite film on the X-Z plane according to a second embodiment of the invention.
Figure 4:
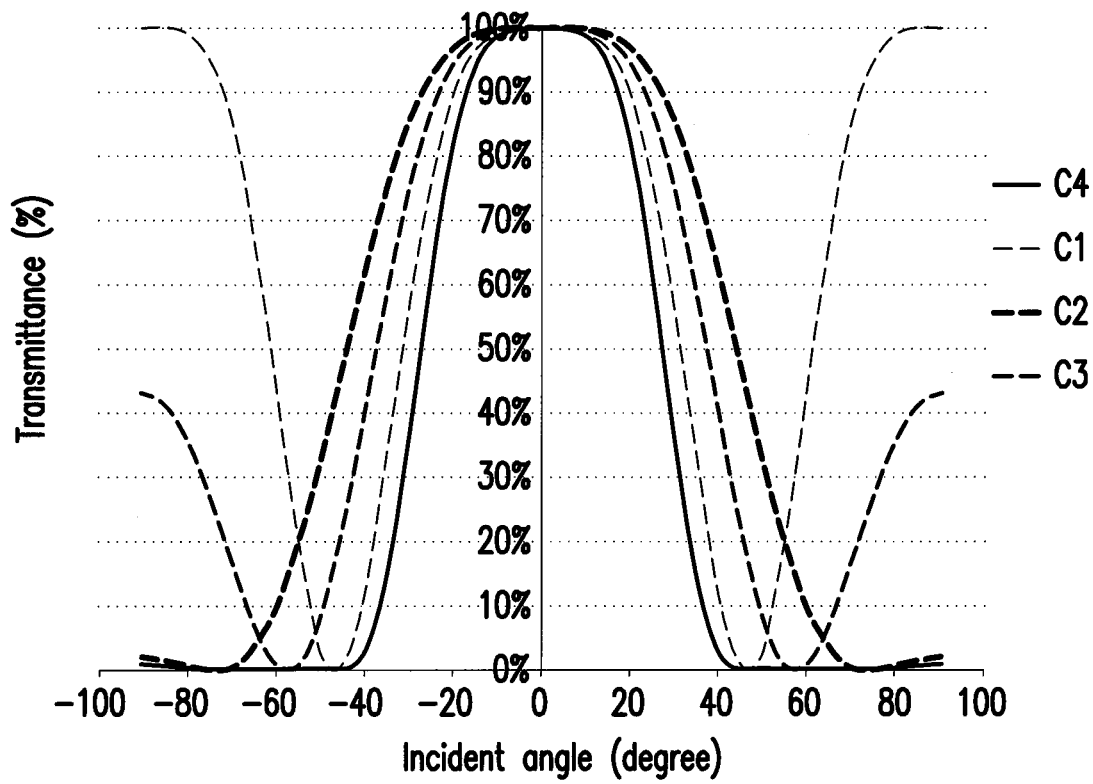
FIG. 4 is a diagram illustrating a relationship of light incident angle-transmittance of the composite film of FIG. 3.
Figure 5:
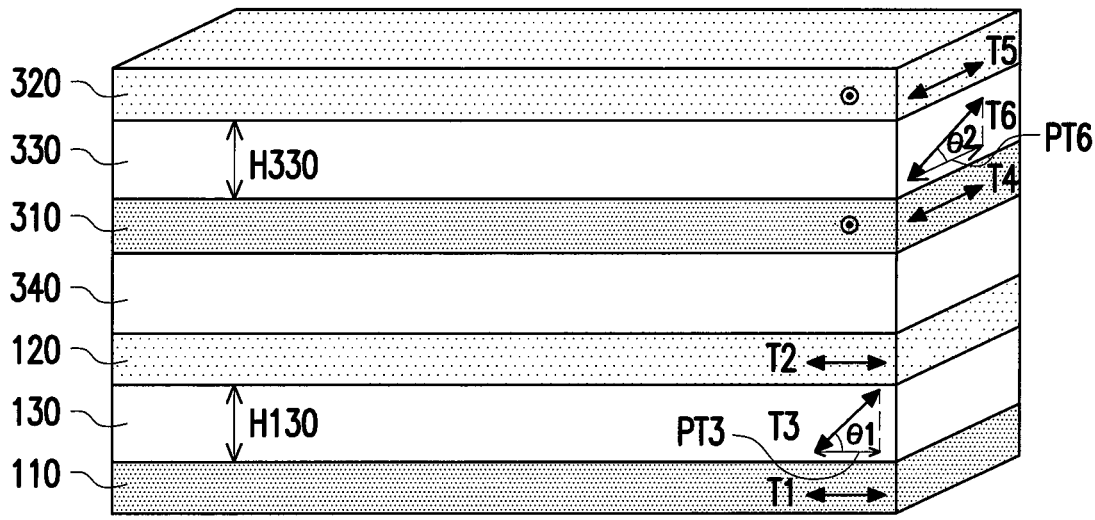
FIG. 5 and FIG. 6 are schematic diagrams of composite films according to a third embodiment and a fourth embodiment of the invention respectively.
Figure 6:
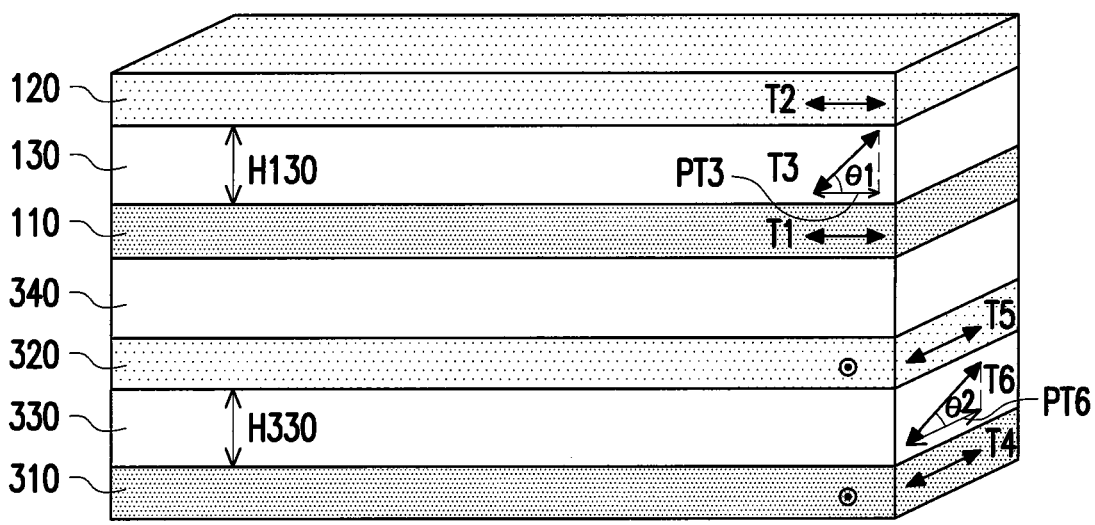

Other embodied forms of the composite film are illustrated by the following FIG. 3 to FIG. 6, wherein the same components are represented by the same notations, and the illustration of the same components is referred to the related description of FIG. 1A and FIG. 1B, and is not repeated again. FIG. 3 is a schematic cross-sectional diagram of a composite film on the X-Z plane according to a second embodiment of the invention. FIG. 4 is a diagram illustrating a relationship of light incident angle-transmittance of the composite film of FIG. 3. FIG. 5 and FIG. 6 are schematic diagrams of composite films according to a third embodiment and a fourth embodiment of the invention respectively.

Referring to FIG. 3, the main difference between a composite film 200 and the composite film 100 of FIG. 1A is as follows. In the composite film 200, the numbers of the at least one second polarizing film 120 and the at least one first phase compensation film 130 are multiple respectively, and the first phase compensation films 130 are disposed between two adjacent second polarizing films 120 and between the first polarizing film 110 and the second polarizing film 120 closest to the first polarizing film 110 respectively.

In the embodiment, the numbers of the at least one second polarizing film 120 and the at least one first phase compensation film 130 are three respectively. When the first included angle θ1 is different, the viewing angle distribution thereof is different. Additionally, the amount of phase retardation of the first phase compensation film 130 is changed with different thickness H130 of the first phase compensation film 130. Thereby, the transmittance curve is also different. Therefore, the embodiment may allow the first included angle θ1 to be different, and allow the thickness H130 of the first phase compensation film 130 to be different so as to obtain different transmittance curves. Also, the desired transmittance curve is obtained by multiplying each of the transmittance curves. In the embodiment, the first included angles θ1 are between 40 degrees and 80 degrees respectively, for example, and the thicknesses H130 of the first phase compensation films 130 corresponding to the first included angles θ1 between 40 degrees and 80 degrees are between 1 μm and 40 μm, for example.

Referring to FIG. 4, the structure of the single-layer first polarizing film 110, the single-layer second polarizing film 120 and the single-layer first phase compensation film 130 is adopted by the composite films corresponding to curves C1, C2 and C3 respectively, wherein the structural difference corresponding to the curves C1, C2 and C3 is that the thicknesses H130 of the first phase compensation films 130 are 5 μm, 6 μm and 9 μm respectively, and the first included angles θ1 are 60 degrees, 62 degrees and 67 degrees respectively. The structure of the single-layer first polarizing film 110, the three-layer second polarizing film 120 and the three-layer first phase compensation film 130 is adopted by the composite film corresponding to a curve C4, and the three-layer first phase compensation film 130 adopts the first phase compensation films 130 corresponding to the curves C1, C2 and C3 respectively. It can be seen from FIG. 4 that the structure adopting the three-layer first phase compensation film 130 (e.g., as the curve C4 shown) not only can have better limited viewing angle (the narrowest viewing angle), but also can effectively reduce large-angle light leakage. For example, the light transmittance of the light beam of which the incident angle greater than 40 degrees is restricted lower than or equal to 5%, even close to 0%.

Referring to FIG. 5, the main difference between a composite film 300 and the composite film 100 of FIG. 1A is as follows. The composite film 300 includes not only the first polarizing film 110, the at least one second polarizing film 120, and the at least one first phase compensation film 130, but also includes a third polarizing film 310, at least one fourth polarizing film 320, at least one second phase compensation film 330, and a half-wave plate 340. The at least one fourth polarizing film 320 is disposed at one side of the third polarizing film 310, and the at least one second phase compensation film 330 is disposed between the third polarizing film 310 and the at least one fourth polarizing film 320. The half-wave plate 340 is disposed at one side of the at least one second polarizing film 120 away from the first polarizing film 110 and located between the at least one second polarizing film 120 and the third polarizing film 310.

The third polarizing film 310 has a third transmission axis T4, and the third transmission axis T4 is perpendicular to the first transmission axis T1. Each fourth polarizing film 320 has a fourth transmission axis T5 parallel to the third transmission axis T4. The third polarizing film 310 and each fourth polarizing film 320 may be linear polarizing films respectively. Alternatively, the third polarizing film 310 and each fourth polarizing film 320 may be composed of a cholesterol liquid crystal layer and a quarter wave plate respectively.

Each second phase compensation film 330 has a second optical axis T6. An orthographic projection PT6 of the second optical axis T6 on the third polarizing film 310 is parallel to an axial direction of the third transmission axis T4, and a second included angle θ2 between the second optical axis T6 and the third polarizing film 310 is greater than 0 degrees and less than 90 degrees. Each second phase compensation film 330 is an O-plate, for example. In the embodiment, each second phase compensation film 330 is composed of a liquid crystal polymer LCP, for example. However, the invention is not limited thereto. In other embodiments, each second phase compensation film 330 may also be formed from a polymer material by pulling and extension. Alternatively, each second phase compensation film 330 may be a liquid crystal panel, and an axial direction of the second optical axis T6 may be controlled by electrical control means. The design of the second included angle θ2 and a thickness H330 of each second phase compensation film 330 can be referred to the related description of the first included angle θ1 and the thickness H130 of each first phase compensation film 130 in FIG. 1A, and is not repeated herein.

In the embodiment, numbers of the at least one second polarizing film 120, the at least one first phase compensation film 130, the at least one fourth polarizing film 320, and the at least one second phase compensation film 330 are one respectively. However, the invention is not limited thereto. In other embodiments, the numbers of the at least one second polarizing film 120, the at least one first phase compensation film 130, the at least one fourth polarizing film 320, and the at least one second phase compensation film 330 may be more than one respectively.

By the disposition of the first polarizing film 110, the at least one second polarizing film 120, and the at least one first phase compensation film 130, the composite film 300 can limit viewing angle along the Y direction and reduce large-angle light leakage along the Y direction. Additionally, the polarization direction of the light beam from the at least one second polarizing film 120 can be deflected by the disposition of the half-wave plate 340. For example, the transverse magnetic wave TM oscillated on the X-Z plane originally (referring to FIG. 1A) is converted to the transverse electric wave TE oscillated along the direction parallel to the Y direction (referring to FIG. 1A), such that the polarization direction of the light beam is parallel to the third transmission axis T4 of the third polarizing film 310. By the disposition of the third polarizing film 310, the at least one fourth polarizing film 320, and the at least one second phase compensation film 330, the composite film 300 can limit viewing angle along the X direction and reduce large-angle light leakage along the X direction. The principle that the third polarizing film 310, the at least one fourth polarizing film 320, and the at least one second phase compensation film 330 achieve narrow viewing angle and the reduction of large-angle light leakage can be referred to the related description of the first polarizing film 110, the at least one second polarizing film 120, and the at least one first phase compensation film 130 achieving narrow viewing angle and the reduction of large-angle light leakage in FIG. 1A and FIG. 1B, and is not repeated herein. In other words, the composite film 300 can limit viewing angle along the X direction and the Y direction and reduce large-angle light leakage along the X direction and the Y direction simultaneously. It is to be added that, under the structure of the embodiment, the first polarizing film 110 may be an absorption-type polarizing film or a reflection-type polarizing film, and each second polarizing film 120, the third polarizing film 310, and each fourth polarizing film 320 may be absorption-type polarizing films.

Referring to FIG. 6, the main difference between a composite film 400 and the composite film 300 of FIG. 5 is as follows. In the composite film 400, the half-wave plate 340 is disposed at one side of the first polarizing film 110 away from the at least one second polarizing film 120 and located between the first polarizing film 110 and the at least one fourth polarizing film 320. Under the structure of the embodiment, the third polarizing film 310 may be an absorption-type polarizing film or a reflection-type polarizing film, and each fourth polarizing film 320, the first polarizing film 110, and each second polarizing film 120 may be absorption-type polarizing films.

Figure 7:
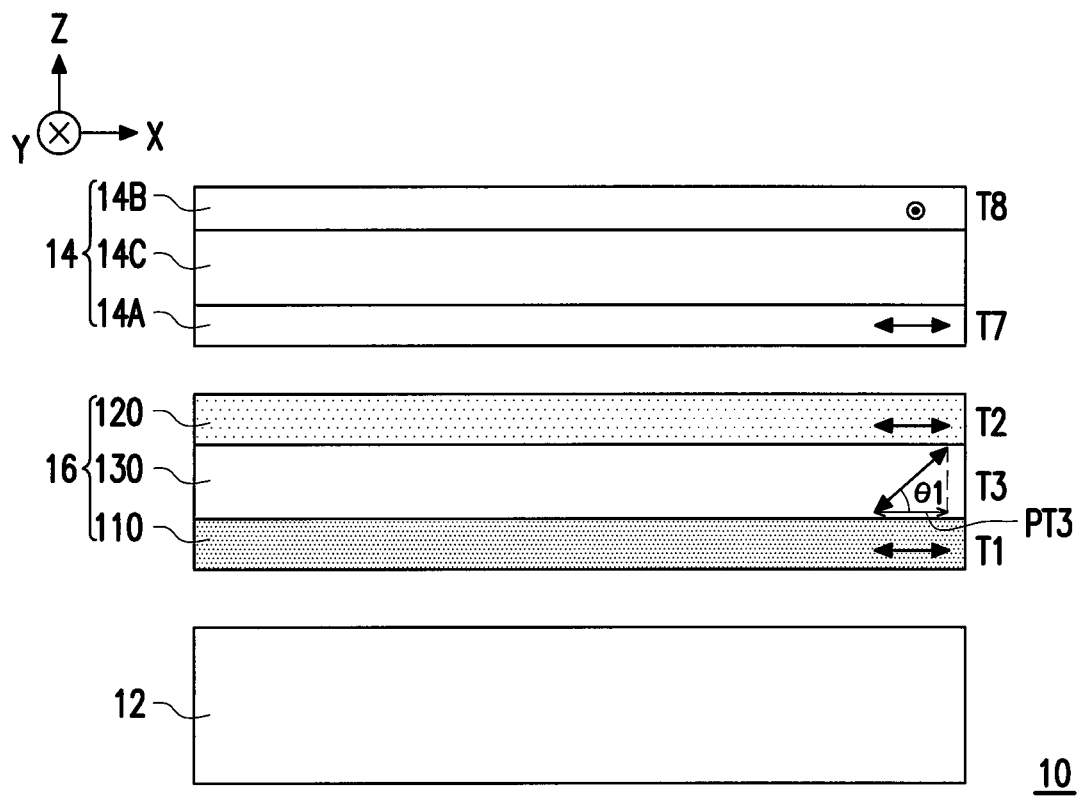
FIG. 7 to FIG. 12 are schematic cross-sectional diagrams of display devices on the X-Z plane according to the first embodiment to a sixth embodiment of the invention respectively.

FIG. 7 to FIG. 12 are schematic cross-sectional diagrams of display devices on the X-Z plane according to the first embodiment to a sixth embodiment of the invention respectively. Referring to FIG. 7, a display device 10 includes a backlight module 12, a display panel 14, and a composite film 16. The backlight module 12 is adapted to provide an illumination light beam, which can be a direct-type backlight module or an edge-type backlight module, but is not limited thereto. The display panel 14 is disposed at one side of the backlight module 12, which is adapted to convert the illumination light beam provided by the backlight module 12 to a display light beam having display information. For instance, the display panel 14 may be a liquid crystal display panel, but is not limited thereto.

In terms of the liquid crystal display panel, the display panel 14 may include a lower polarizing plate 14A, an upper polarizing plate 14B, and a display unit 14C located between the lower polarizing plate 14A and the upper polarizing plate 14B. The display unit 14C may include an active element array substrate (not shown), a color filter substrate (not shown), and a liquid crystal layer (not shown) located between the active element array substrate and the color filter substrate. The lower polarizing plate 14A and the upper polarizing plate 14B are disposed on two opposite surfaces of the display unit 14C respectively, wherein transmission axes T7 and T8 of the lower polarizing plate 14A and the upper polarizing plate 14B are perpendicular to each other, for example, but is not limited to.

The composite film 16 is disposed at one side of the backlight module 12 and overlapped with the display panel 14. In the embodiment, the composite film 16 is disposed between the backlight module 12 and the display panel 14, and the lower polarizing plate 14A is disposed adjacent to the second polarizing film 120. Therefore, the transmission axis T7 of the lower polarizing plate 14A is parallel to the second transmission axis T2 of the second polarizing film 120, such that the polarized illumination light beam incident from the second polarizing film 120 can pass through the lower polarizing plate 14A.

The composite film 16 may adopt the structure of the composite film 100 as shown in FIG. 1A. By the disposition of the first polarizing film 110, the at least one second polarizing film 120, and the at least one first phase compensation film 130, the composite film 300 can limit viewing angle along a single direction (e.g., Y direction) and reduce large-angle light leakage along a single direction (e.g., Y direction). Also, the display device 10 adopting the composite film 16 can achieve the requirements of anti-spy on a single direction (e.g., Y direction) or the limitation of viewing angle along a single direction (e.g., Y direction) and the reduction of large-angle light leakage along a single direction (e.g., Y direction). For instance, the display device 10 may be a display device for vehicle. By the limitation of viewing angle along the Y direction (longitudinal direction) and the reduction of large-angle light leakage along the Y direction, reflection image generated on a windshield which may affect the driver's line of sight can be avoided, so as to improve driving safety. On the other hand, the first transmission axis T1 and the second transmission axis T2 can be parallel to the Y direction, and the first optical axis T3 can be inclined relative to the Y direction, so as to limit viewing angle along the X direction and reduce large-angle light leakage along the X direction. Therefore, the display device 10 may achieve the requirements of anti-spy along the X direction or the limitation of viewing angle along the X direction and the reduction of large-angle light leakage along the X direction when the display device is a personal computer or a public computer, for example, but is not limited thereto. If it is desired to further improve the effects of anti-spy on a single direction or the limitation of viewing angle along a single direction and the reduction of the large-angle light leakage along a single direction, the numbers of the at least one second polarizing film 120 and the at least one first phase compensation film 130 can be further increased, such as using the structure of the composite film 200 in FIG. 3. Additionally, when there is a requirement of bidirectional anti-spy or bidirectional limitation of viewing angle and bidirectional reduction of large-angle light leakage, the structure of the composite film 300 in FIG. 5 or the structure of the composite film 400 in FIG. 6 can be adopted. The following embodiments are applicable to the above improvements, and are not repeated hereinafter.

Under the structure that the composite film 16 is disposed between the backlight module 12 and the display panel 14, the first polarizing film 110 can adopt an absorption-type polarizing film or a reflection-type polarizing film. If the first polarizing film 110 adopts the reflection-type polarizing film, the linearly polarized light of which the polarization direction is perpendicular to the first transmission axis T1 can be reflected back to the backlight module 12 by the first polarizing film 110, so as to effectively improve light utilization; thereby, the brightness of the display device 10 is enhanced. On the other hand, the at least one second polarizing film 120 can adopt the absorption-type polarizing film so as to reduce stray light.

Other embodied forms of the display device are illustrated by the following FIG. 8 to FIG. 12, wherein the same components are represented by the same notations, and the illustration of the same components is referred to the related description of FIG. 7, and is not repeated again.

Figure 8:
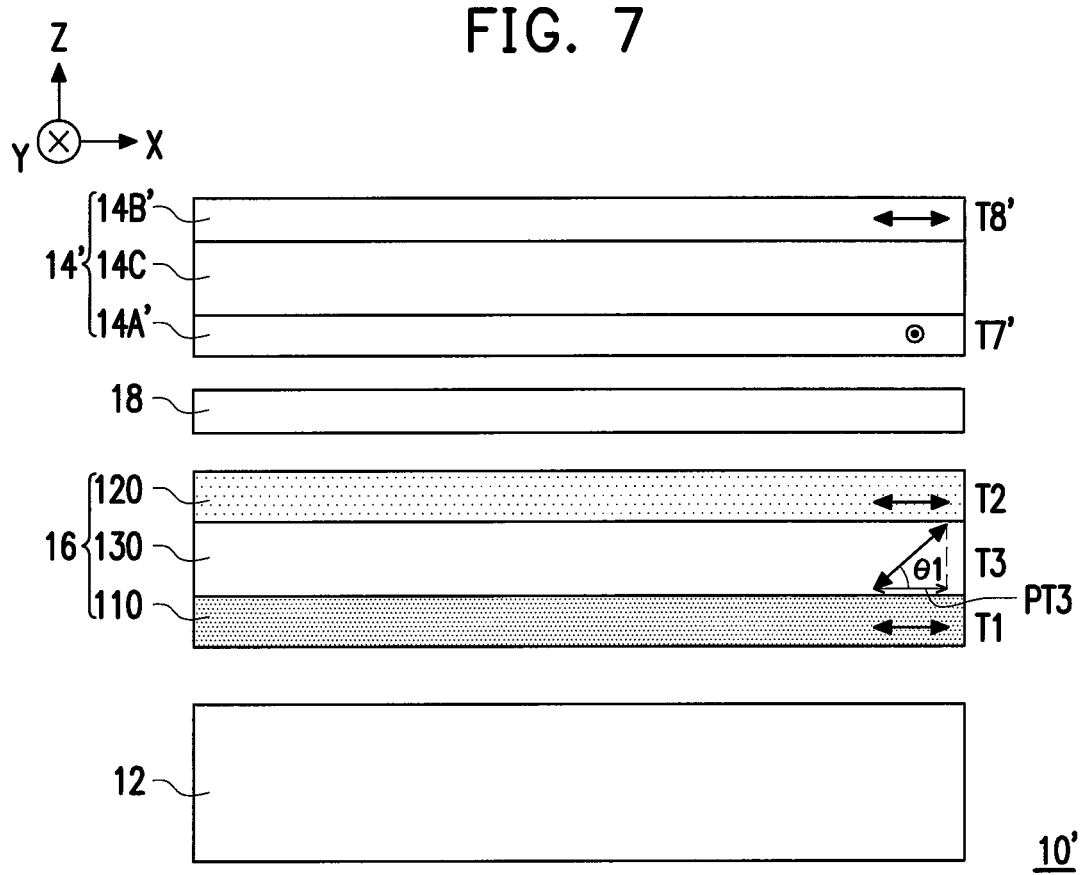

Referring to FIG. 8, the main difference between a display device 10' and the display device 10 of FIG. 7 is as follows. In the display device 10', a transmission axis T7' of a lower polarizing plate 14A' of the display panel 14' is not required to be disposed parallel to the transmission axis T2 of the second polarizing film 120 closest to the lower polarizing plate 14A'. For example, the transmission axis T7' is parallel to the Y direction and perpendicular to the transmission axis T2. A transmission axis T8' of an upper polarizing plate 14B' of the display panel 14' is parallel to the X direction and perpendicular to the transmission axis T7', for example. Additionally, the display device 10' further includes a half-wave plate 18. The half-wave plate 18 is located between the display panel 14' and the composite film 16. The polarization direction of the light beam from the at least one second polarizing film 120 can be deflected by the half-wave plate 18, for example, the transverse magnetic wave TM oscillated on the X-Z plane originally (referring to FIG. 1A) is converted to the transverse electric wave TE oscillated along the direction parallel to the Y direction (referring to FIG. 1A), such that the polarization direction of the light beam passing through the half-wave plate 18 is parallel to the transmission axis T7' of the lower polarizing plate 14A'. Thus, the light beam can pass through the lower polarizing plate 14A'.

Figure 9:
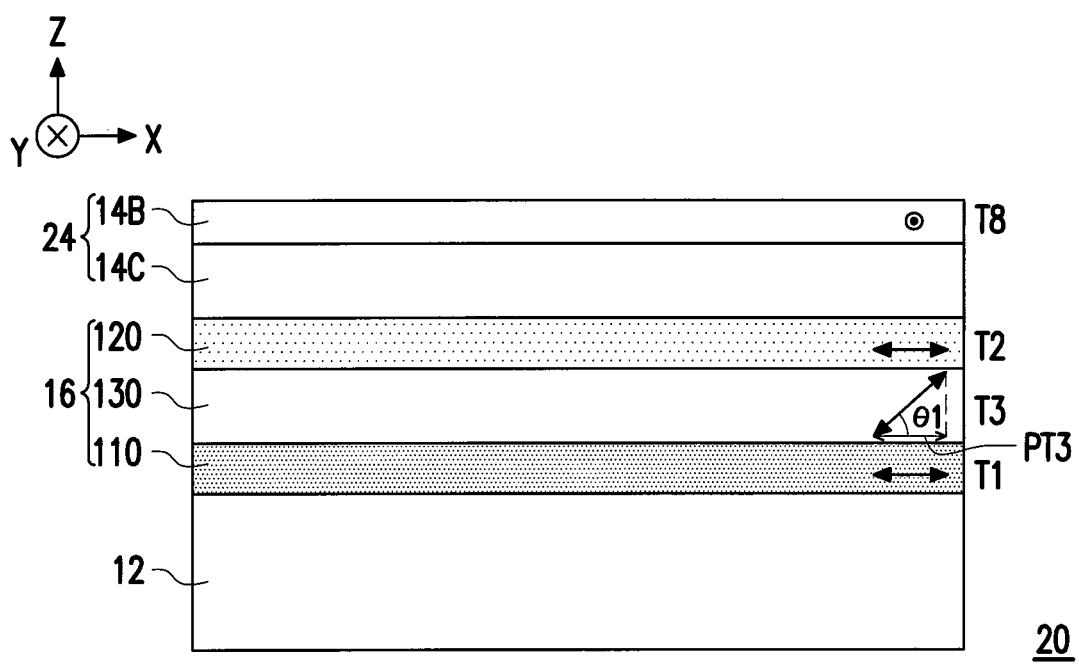

Referring to FIG. 9, the main difference between a display device 20 and the display device 10 of FIG. 7 is as follows. In the display device 20, the second polarizing film 120 farthest away from the first polarizing film 110 is served as a lower polarizing plate of a display panel 24. That is, the lower polarizing plate 14A of the display panel 14 in FIG. 7 can be omitted in the display panel 24 of the display device 20.

It is to be added that, in the embodiments of FIG. 7 to FIG. 9, if the backlight module 12 adopts a polarized-type backlight module (i.e., an illumination light beam provided by the backlight module is a linearly polarized light), a polarizing layer (not shown) in the polarized-type backlight module can be integrated with the first polarizing film 110. Thus, the polarizing layer in the polarized-type backlight module can be omitted.

Figure 10:
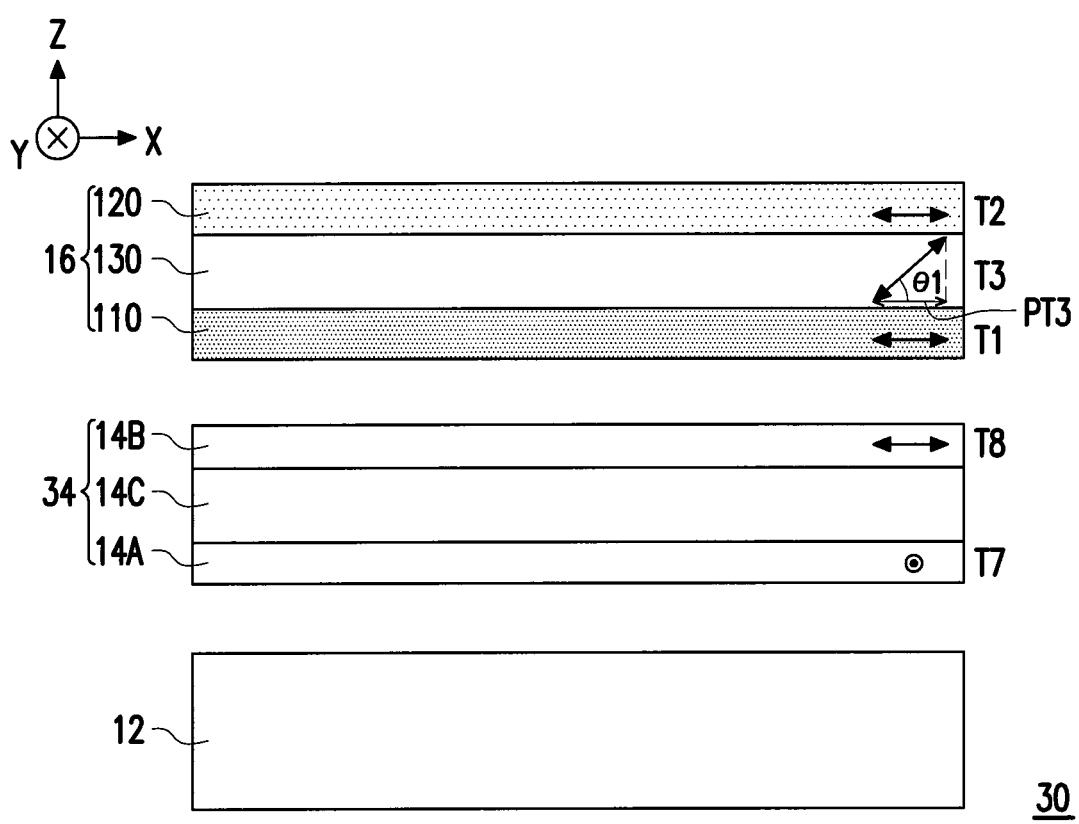
Figure 11:
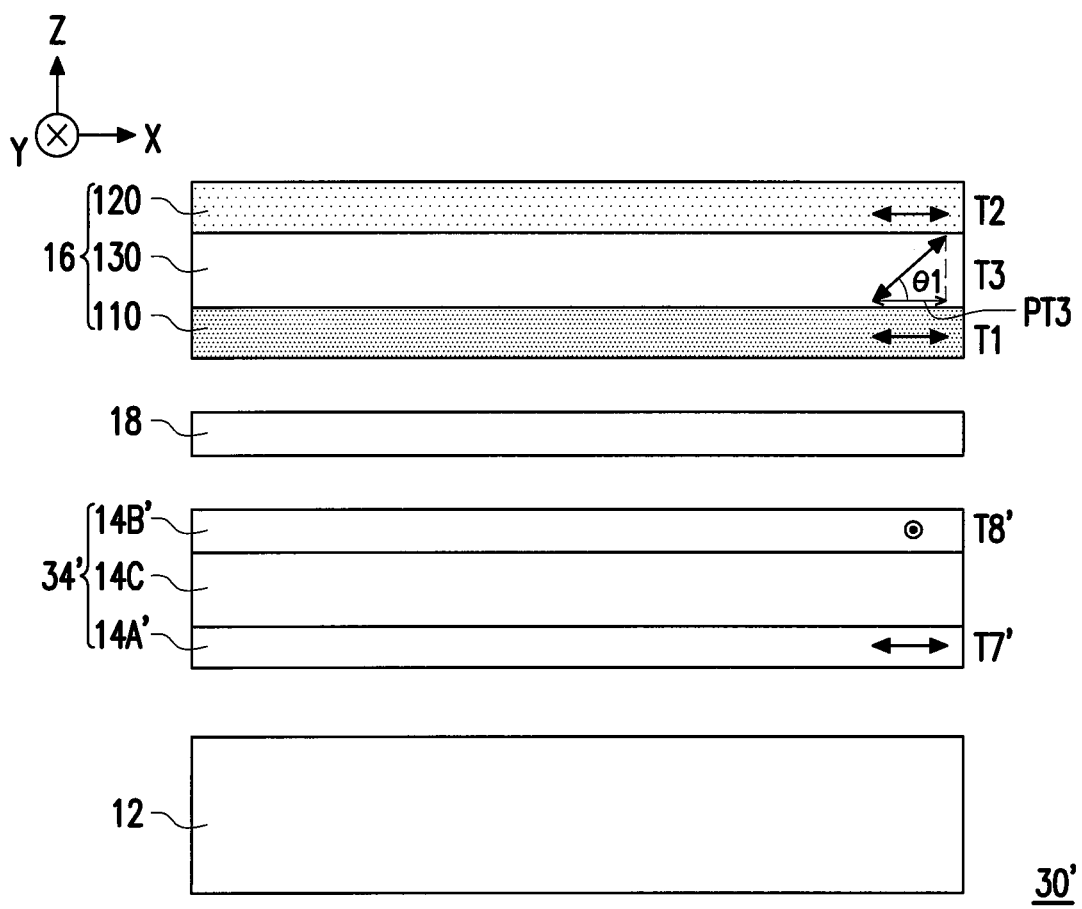

Referring to FIG. 10, the main difference between a display device 30 and the display device 10 of FIG. 7 is as follows. In the display device 30, a display panel 34 is disposed between the composite film 16 and the backlight module 12, and the upper polarizing plate 14B of the display panel 34 is disposed adjacent to the first polarizing film 110. Therefore, the transmission axis T8 of the upper polarizing plate 14B is parallel to the first transmission axis T1 of the first polarizing film 110, such that the polarized display light beam incident from the upper polarizing plate 14B can pass through the first polarizing film 110. However, the invention is not limited thereto. As shown in FIG. 11, in a display device 30', the transmission axis T8' of the upper polarizing plate 14B' of the display panel 34' is not required to be disposed parallel to the first transmission axis T1 of the first polarizing film 110. For example, the transmission axis T8' may be perpendicular to the first transmission axis T1 of the first polarizing film 110 and parallel to the Y direction. The transmission axis T7' of the lower polarizing plate 14A' of the display panel 34' is parallel to the X direction and perpendicular to the transmission axis T8', for example. The display device 30' may further include the half-wave plate 18. The half-wave plate 18 is located between the display panel 34' and the composite film 16. The polarization direction of the light beam from the upper polarizing plate 14B' can be deflected by the half-wave plate 18, for example, the transverse electric wave TE oscillated along the direction parallel to the Y direction originally (referring to FIG. 1A) is converted to the transverse magnetic wave TM oscillated on the X-Z plane (referring to FIG. 1A), such that the polarization direction of the light beam passing through the half-wave plate 18 is parallel to the first transmission axis T1 of the first polarizing film 110. Thus, the light beam can pass through the first polarizing film 110.

Additionally, in the embodiments of FIG. 10 and FIG. 11, under the structure that the display panels 34 and 34' are disposed between the composite film 16 and the backlight module 12, the first polarizing film 110 and each second polarizing film 120 adopt absorption-type polarizing films so as to reduce stray light.

Figure 12:
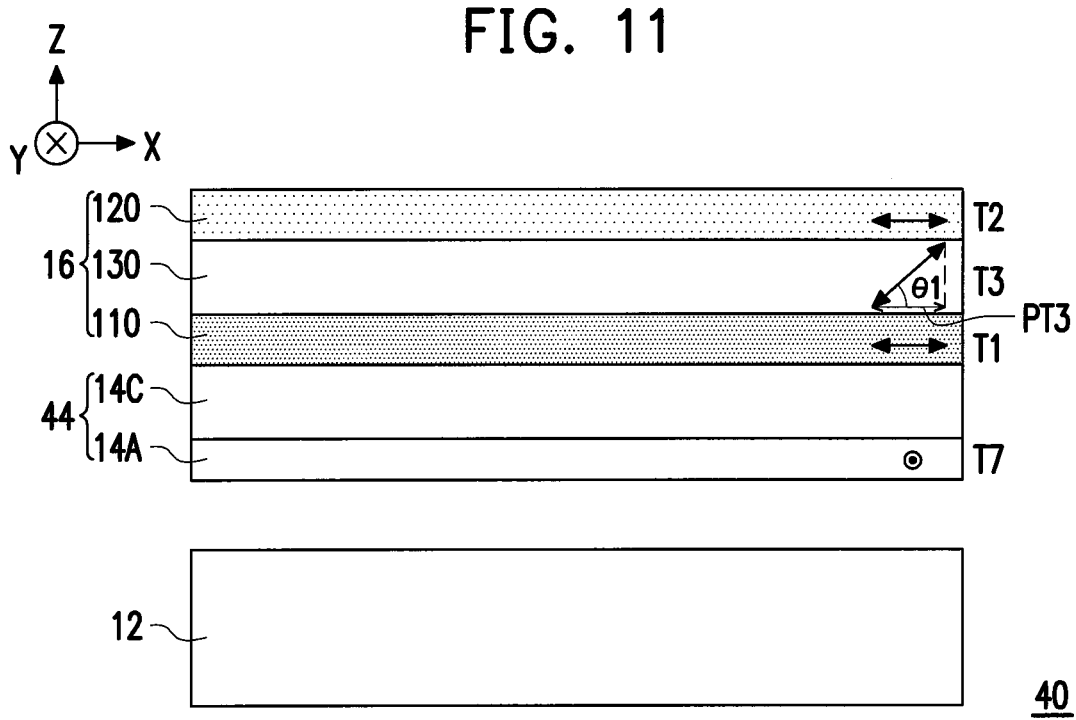

Referring to FIG. 12, the main difference between a display device 40 and the display device 30 of FIG. 10 is as follows. In the display device 40, the first polarizing film 110 is served as an upper polarizing plate of the display panel 44. That is, the upper polarizing plate 14B of the display panel 34 in FIG. 9 can be omitted in the display panel 44 of the display device 40.

In summary, the embodiments of the invention have at least one of the advantages or effects below. In the composite film of the invention, the first optical axis of each first phase compensation film is inclined relative to the first polarizing film, and the orthographic projection of the first optical axis on the first polarizing film is parallel to the axial direction of the first transmission axis. The polarization direction of the light beam incident the composite film in a large angle along the direction perpendicular to the axial direction of the first transmission axis can be deflected by each first phase compensation film, such that the large-angle light beam is absorbed by the second polarizing film. Thus, the composite film can limit viewing angle and reduce large-angle light leakage. Also, the display device using the composite film can achieve the requirements of anti-spy and viewing angle limitations.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A composite film, comprising:
a first polarizing film, having a first transmission axis;
a plurality of second polarizing films, disposed at one side of the first polarizing film, and each second polarizing film having a second transmission axis parallel to the first transmission axis; and
a plurality of first phase compensation films, disposed between two adjacent second polarizing films and disposed between the first polarizing film and the second polarizing film closest to the first polarizing film respectively, wherein each first phase compensation film has a first optical axis, an orthographic projection of the first optical axis on the first polarizing film is parallel to an axial direction of the first transmission axis, and a first included angle between the first optical axis and the first polarizing film is greater than 0 degrees and less than 90 degrees, and the first included angles between the first optical axes of each of the first phase compensation films and the first polarizing film are different from each other.

2. The composite film according to claim 1, wherein the numbers of the at least one second polarizing film and the at least one first phase compensation film are three respectively.

3. The composite film according to claim 1, wherein the first included angles are between 40 degrees and 80 degrees respectively, and thicknesses of the first phase compensation films corresponding to the first included angles between 40 degrees and 80 degrees are between 1 µm and 40 µm.

4. The composite film according to claim 1, wherein the first polarizing film is an absorption-type polarizing film or a reflection-type polarizing film, and each second polarizing film is an absorption-type polarizing film.

5. The composite film according to claim 1, further comprising a half-wave plate disposed at one side of the at least one second polarizing film away from the first polarizing film.

6. The composite film according to claim 1, further comprising a half-wave plate disposed at one side of the first polarizing film away from the at least one second polarizing film.

7. A display device, comprising:
a backlight module;
a display panel, disposed at one side of the backlight module; and
a composite film, disposed at one side of the backlight module and overlapped with the display panel, the composite film comprising:
a first polarizing film, having a first transmission axis;
a plurality of second polarizing films, disposed at one side of the first polarizing film, and each second polarizing film having a second transmission axis parallel to the first transmission axis; and
a plurality of first phase compensation films, disposed between two adjacent second polarizing films and disposed between the first polarizing film and the second polarizing film closest to the first polarizing film respectively, wherein each first phase compensation film has a first optical axis, an orthographic projection of the first optical axis on the first polarizing film is parallel to an axial direction of the first transmission axis, and a first included angle between the first optical axis and the first polarizing film is greater than 0 degrees and less than 90 degrees, and the first included angles between the first optical axes of each of the first phase compensation films and the first polarizing film are different from each other.

8. The display device according to claim 7, wherein the numbers of the plurality of second polarizing film and the plurality of first phase compensation film are three respectively.

9. The display device according to claim 7, wherein the first included angles are between 40 degrees and 80 degrees respectively, and thicknesses of the first phase compensation films corresponding to the first included angles between 40 degrees and 80 degrees are between 1 µm and 40 µm.

10. The display device according to claim 7, wherein a product of an absolute value of a difference between refractive indexes of each first phase compensation film and a thickness of the first phase compensation film is between 0.1 µm and 8 µm.

11. The display device according to claim 7, wherein the composite film is disposed between the backlight module and the display panel, and the second polarizing film farthest away from the first polarizing film is served as a lower polarizing plate of the display panel.

12. The display device according to claim 11, wherein the first polarizing film is an absorption-type polarizing film or a reflection-type polarizing film, and each second polarizing film is an absorption-type polarizing film.

13. The display device according to claim 11, wherein the composite film further comprises a half-wave plate disposed at one side of the at least one second polarizing film away from the first polarizing film.

14. The display device according to claim 7, wherein the display panel is disposed between the composite film and the backlight module, and the first polarizing film is served as an upper polarizing plate of the display panel.

15. The display device according to claim 14, wherein the first polarizing film and each second polarizing film are absorption-type polarizing films.

16. The display device according to claim 14, wherein the composite film further comprises a half-wave plate disposed at one side of the first polarizing film away from the at least one second polarizing film.

* * * * *